(12) United States Patent
Mobley et al.

(10) Patent No.: US 6,367,778 B1
(45) Date of Patent: Apr. 9, 2002

(54) ADJUSTABLE CABLE PULLING APPARATUS

(75) Inventors: Arthur S. Mobley, Edgewater; William W. Banks, New Market, both of MD (US)

(73) Assignee: Parallex, Inc., Arlington, VA (US)

( * ) Notice: Subject to any disclaimer, the term of this patent is extended or adjusted under 35 U.S.C. 154(b) by 0 days.

(21) Appl. No.: 09/414,870

(22) Filed: Oct. 8, 1999

(51) Int. Cl.[7] ................................................. F21C 29/16
(52) U.S. Cl. ................................................. 254/134.3 R
(58) Field of Search ................ 254/134.3 R, 134.3 PA, 254/134.3 FT; 226/181, 182

(56) References Cited

U.S. PATENT DOCUMENTS

| | | | |
|---|---|---|---|
| 3,145,973 A | * | 8/1964 | MacFarlane ......... 254/134.3 A |
| 3,231,913 A | * | 2/1966 | Reinhardt ............ 254/134.3 R |
| 3,232,558 A | * | 2/1966 | Barkley et al. ....... 254/134.3 R |
| 3,474,946 A | | 10/1969 | Desplats et al. |
| 3,690,529 A | | 9/1972 | Prest |
| 3,901,425 A | | 8/1975 | Taylor et al. |
| 4,382,581 A | | 5/1983 | Wimer et al. |
| 4,456,225 A | | 6/1984 | Lucas |
| 4,497,470 A | | 2/1985 | Carter et al. |
| 4,508,251 A | | 4/1985 | Harada et al. |
| 4,593,884 A | | 6/1986 | Zschocke et al. |
| 4,635,875 A | | 1/1987 | Apple |
| 4,669,705 A | | 6/1987 | Langston |
| 4,822,005 A | | 4/1989 | Aleshire |
| 4,884,784 A | | 12/1989 | Nix et al. |
| 4,899,988 A | | 2/1990 | Mills |
| 4,971,293 A | | 11/1990 | Roberson, Jr. |
| 5,263,624 A | | 11/1993 | Zuidberg |
| 5,390,841 A | | 2/1995 | Horiuchi et al. |
| 5,464,193 A | | 11/1995 | Wrate |
| 5,624,207 A | | 4/1997 | Berges |
| 5,683,073 A | | 11/1997 | Pickrell |
| 5,813,658 A | | 9/1998 | Kaminski et al. |
| 6,073,916 A | * | 6/2000 | Plummer ............. 254/134.3 R |

* cited by examiner

Primary Examiner—Robert C. Watson
(74) Attorney, Agent, or Firm—Nixon Peabody LLP

(57) ABSTRACT

An adjustable cable pulling apparatus and method for pulling cable through interior compartments of a marine vessel. The apparatus consists of a motor, a pair of rollers and a plurality of drive gears that transfer the driving force of the motor to at least one of the rollers for pulling cable therebetween. The cable is manually threaded through the rollers of the apparatus and then can operate automatically once the apparatus is energized. The apparatus is portable and can be mounted various cable pulling configurations. Additionally, the apparatus is adjustable to accept various sized cables which can be pulled at various speeds. Furthermore, the clamping force of the rollers can be adjusted to incrementally increase or decrease the frictional forces between the cable and the rollers.

22 Claims, 18 Drawing Sheets

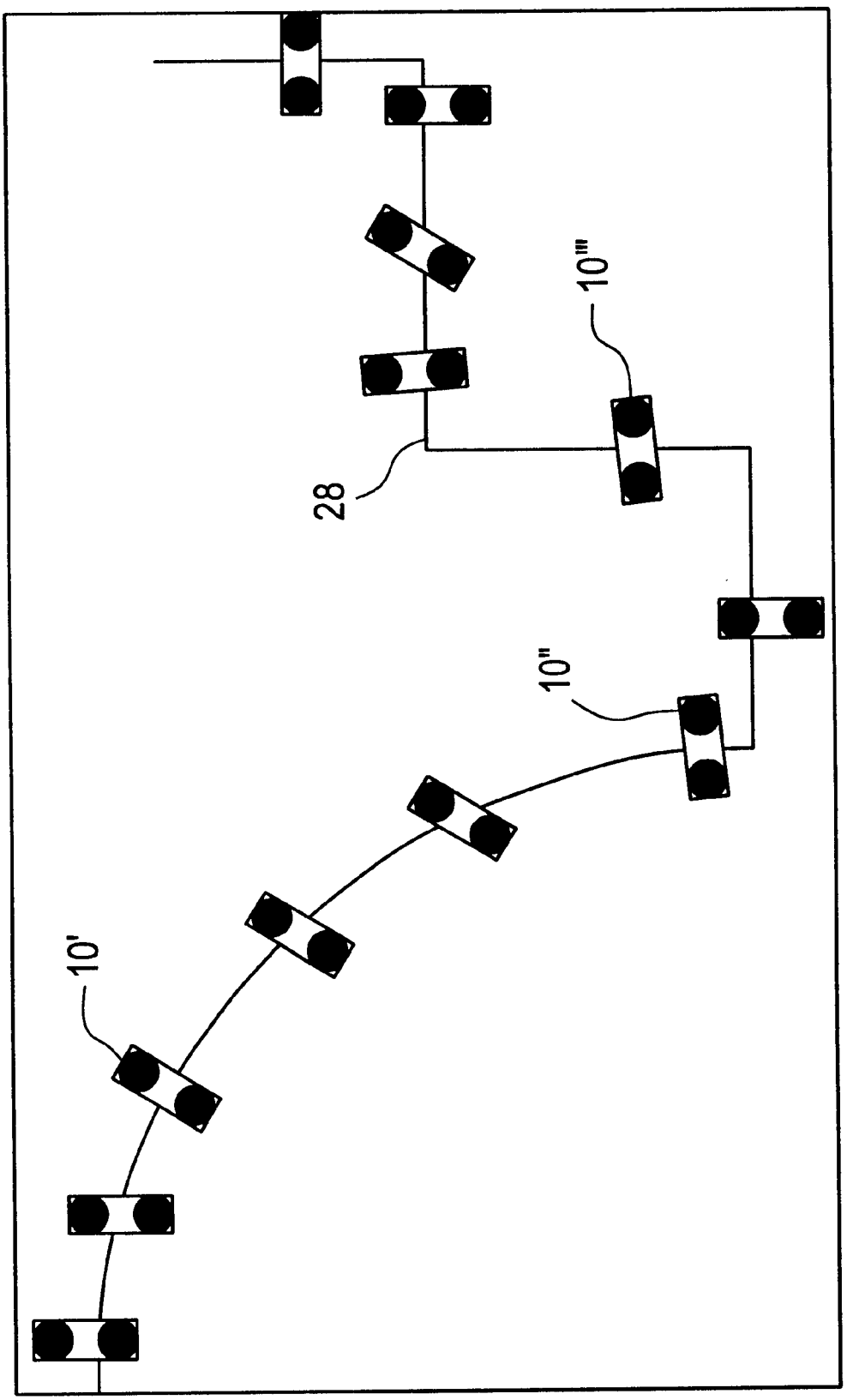

ADJUSTABLE CABLE PULLING APPARATUS

BACKGROUND OF INVENTION

1. Field of Invention

The present invention relates to an adjustable cable pulling apparatus and method used for pulling cable, and more particularly, to a cable puller for moving cable through the interior compartments of marine vessels.

2. Description of the Related Art

Electricians and large crews during both shipyard installations and maintenance operations are often required to pull large diameter cables. In the past, the installation of cable in Naval ships has been difficult because Naval ships are highly compartmentalized and watertight for good survivability characteristics in case of battle damage. Since the advent of electricity on ships, electrical cable has been run throughout the ship compartment bullheads via small pipe-like fittings that have compression rings to press against the cable to make an airtight/watertight seal. These fitting through which the electrical cable is threaded are called stuffing tubes. The stuffing tubes make installation and removal of electrical cables very labor intensive. The primary cause of difficulty is the coefficient of friction created between the rubber or plastic outer cable covering and the steel hangers used to support the cable, and stuffing tubes through which the cable must traverse.

The cable pulling operation typically requires several workers in each compartment passing the cable hand-over-hand within the compartment and through the stuffing tubes. It is similar to a bucket brigade except workers are reaching over their head while standing on scaffolding, which makes the job difficult, slow, and dangerous for the workers involved. As many as 30–100 workers may be involved in a single cable pulling operation. The cable must often make tight "S" turns to be properly routed. Moreover, the process must be well coordinated to avoid damage to the cable and personnel.

The cables are both long and heavy. The weight of the cables increases linearly as a function of how much cable is spooled out through the ship, which in turn makes handling difficult, time consuming and creates a high risk for back/shoulder and hand injury.

Conversely, pulling long runs of cable through electrical ducts in land-based applications is accomplished using a sequence of winches with one or more capstan wheels. The capstan wheel is driven by an individual electrical or hydraulic motor that turn the capstan wheels and pulls the cable through the electrical duct. Although these types of cable pullers have been quite effective in pulling cable in land-based applications. However, the land-based cable pullers are not portable or versatile enough to be easily adapted for use below the decks of a marine vessel. An example of a typical land-based cable puller is in U.S. Pat. No. 5,464,193 to Wrate which discloses a portable wire pulling device that can be secured into pulling position and easily released. The device has, in part, a housing and a frame with vertical hollow posts, a sheave between the posts, a motor driven capstan mounted on the housing and control power. The device can be run on AC or DC power, or can be used to charge internally mounted DC batteries. A number of pulling speeds can be obtained, depending on the type of control and selection device used. However, this large portable device has been designed for land-based applications and would not be easily adapted for pulling cable on a marine vessel where it is likely the device would need to be mounted off the ground or from a ceiling structure in confined spaces and moved from compartment to compartment.

More recently, there have been electrical cable pulling devices and systems that have been adapted to be used in marine applications. U.S. Pat. No. 5,624,207 to Berges discloses a marine seismic cable deployment and retrieval system for utilization in conjunction with a marine vessel. The system consists of a large wheel mounted on the vessel's deck for retrieving seismic cable from the water, and a horizontally deck-mounted cable handler comprising an eight wheel cable puller for pulling cable. The cable puller is comprised four pairs of tires in rotational contact configured to frictionally grab and pull a seismic cable along a linear path. A smaller rear cable puller further urges the cable to the rear of the vessel, and down into the main deck via a chute arrangement. However, this cable puller is large and takes up significant space on the deck of the vessel, which would make the cable puller difficult to adapt to internal ship cable pulling operations below deck. Additionally, the cable pullers are permanently anchored to the deck and are not designed to be moved around the deck or different level decks for multiple cable pulling configurations.

Although these inventions may be useful as cable pulling apparatus in special applications, they do not represent the most efficient and economical way of achieving the desired results.

SUMMARY OF INVENTION

It is an object of the present invention to overcome the limitations of the prior art systems by providing a small, adjustable cable pulling apparatus and method that can pull and thread electrical cable through the interior compartments of a marine vessel easily and safely.

It is another object of the present invention to provide a cable pulling apparatus that can be mounted in a variety of different cable pulling configurations.

Still another object of the present invention is to maximize the speed and efficiency of pulling electrical cable through the interior compartments of a marine vessel.

Another object of the present invention is to minimize the inconveniences and size of present cable pulling devices. The cable puller of the present invention is both lightweight (weighing less than 60 pounds) and portable. It can be carried on and off the job site manually by only a single worker, if necessary.

It is an object of the present invention to provide a cable pulling apparatus that can be adapted for different size electrical cable.

It is another object of the present invention to improve the safety of pulling electrical cable through the interior compartments of a marine vessel by taking what was once a manual task and providing a degree of automation to significantly reduce the number of workers necessary to complete a cable pulling operation.

In accomplishing these and other objectives of the present invention, there is provided a cable pulling apparatus having a frame and a first roller driven by a power source rotatably mounted to the frame. A second roller is rotatably mounted to the frame and spaced from the first roller to allow an electrical cable to pass therebetween. A plurality of drive gears are engaged with the power source and at least the first roller to transfer a motive force of the power source to at least the first roller. Means adjust the spacing between the first and second rollers to increase or decrease friction forces between the cable and the first and second rollers.

Other features and advantages of the present invention will become apparent from the following description of the invention which refers to the accompanying drawings.

BRIEF DESCRIPTION OF THE DRAWINGS

FIG. 6 is a schematic view of a plurality of cable pullers mounted in various configurations.

DETAILED DESCRIPTION OF THE PREFERRED EMBODIMENTS

Figure 1:
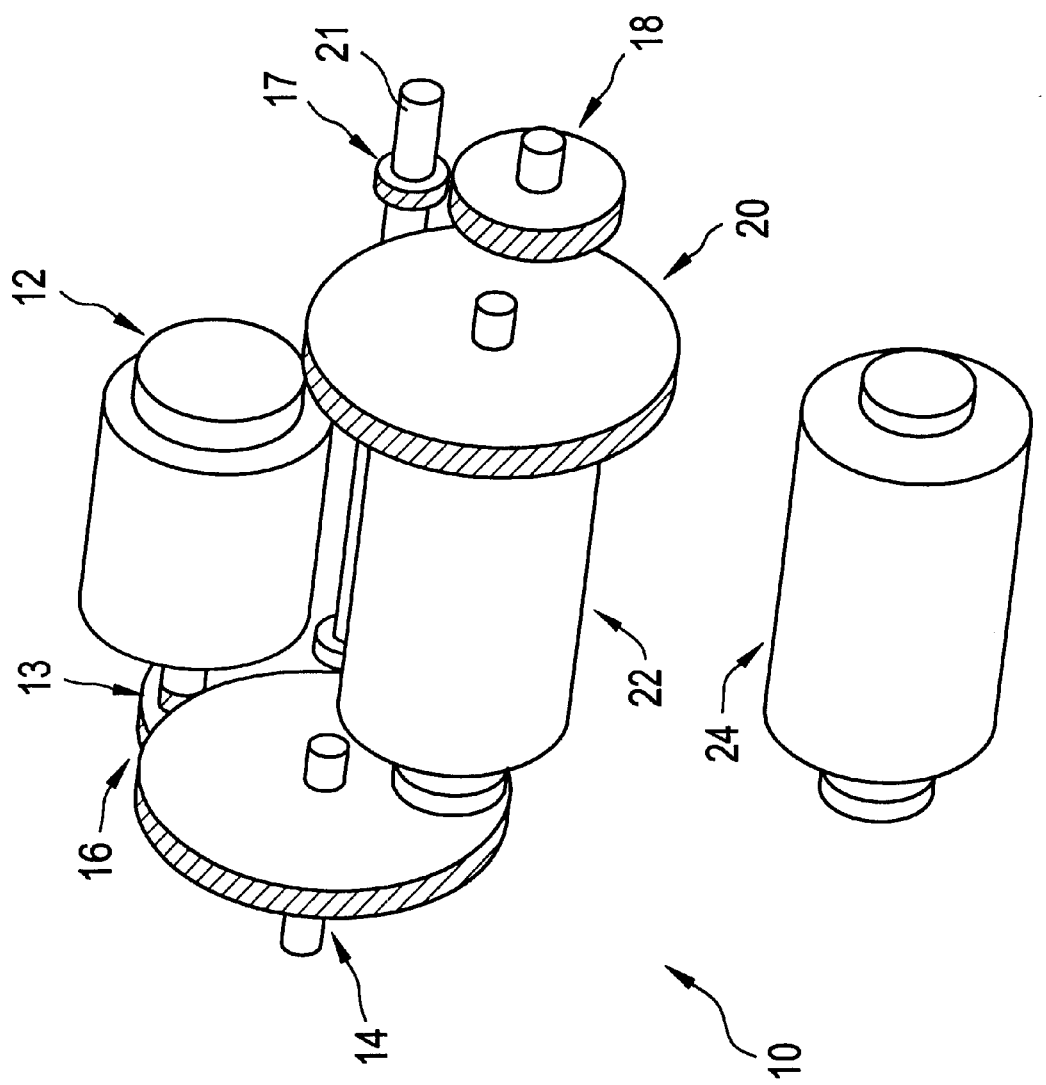
FIG. 1 is a perspective view of a first embodiment of the cable pulling apparatus of the present invention.
Figure 2:
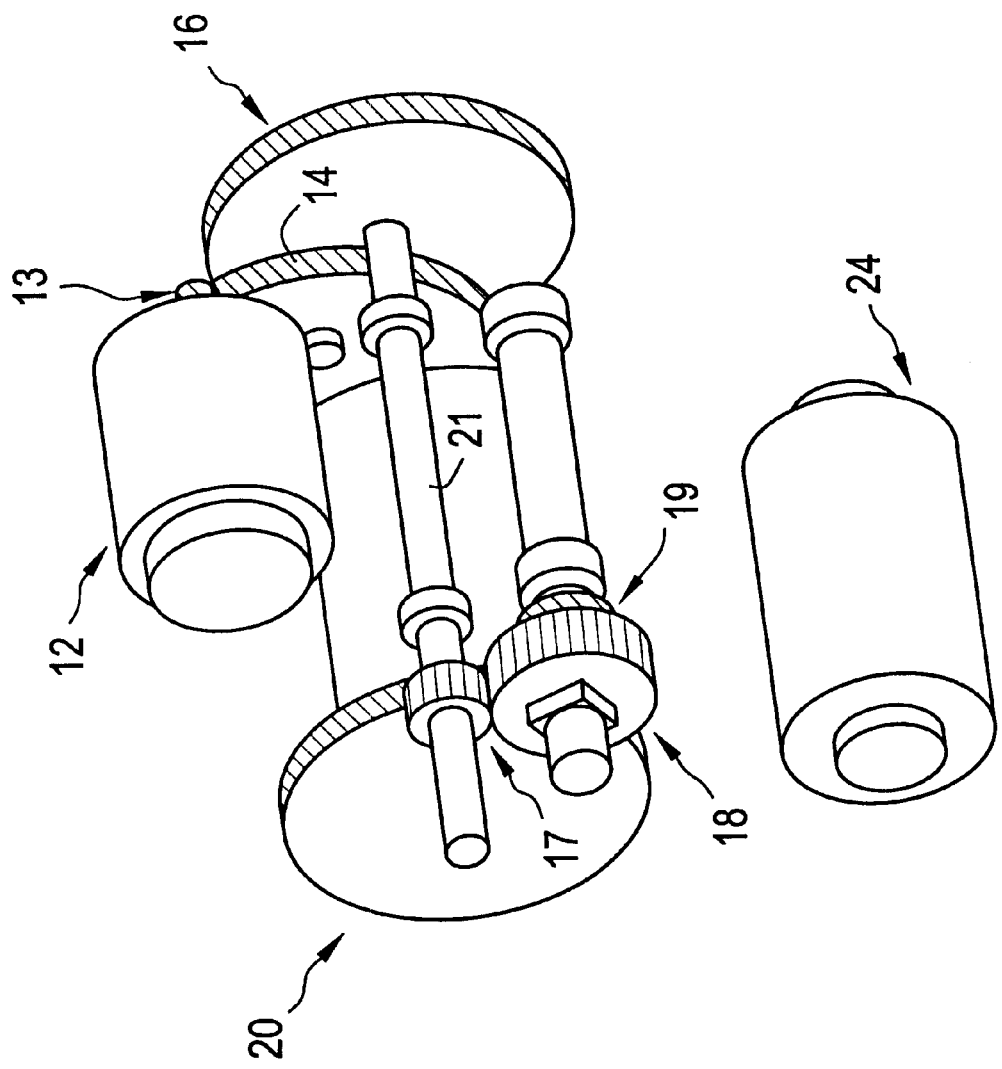
FIG. 2 is a rear view of the cable pulling apparatus of FIG. 1.
Figure 3:
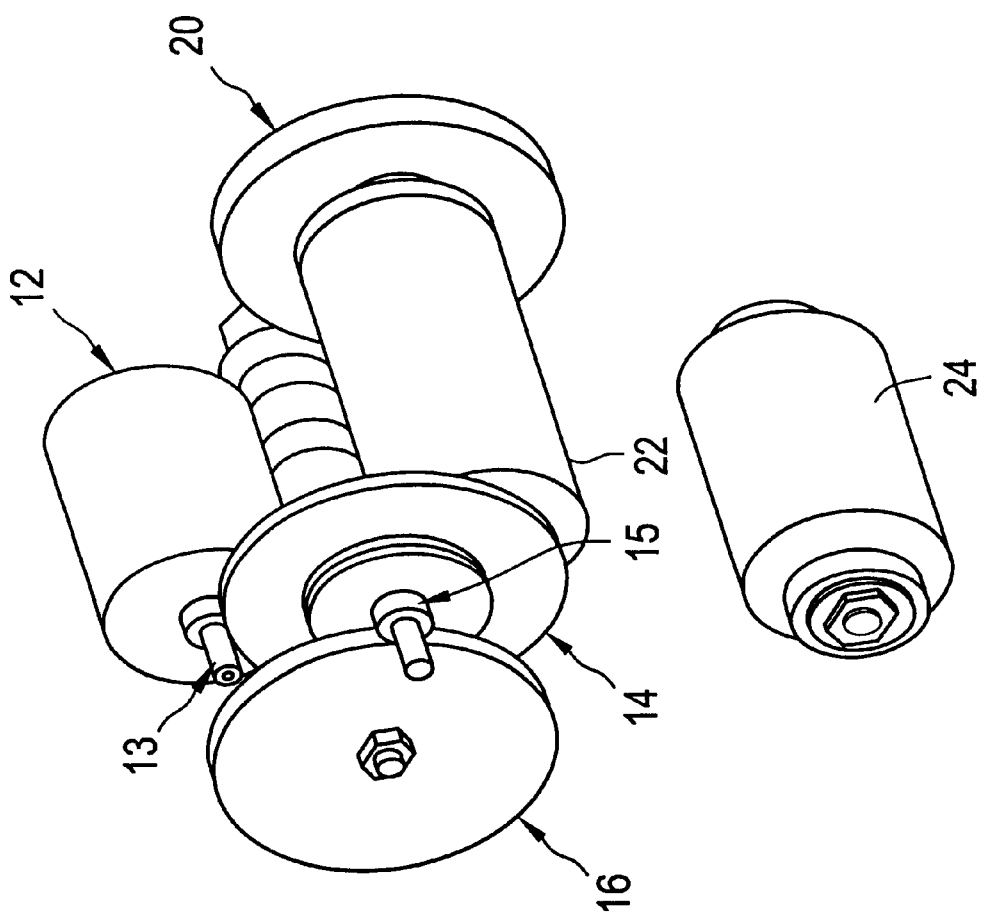
FIG. 3 is a side view of FIG. 1.

Referring to FIGS. 1–3, a first embodiment of the cable pulling apparatus 10 of the present invention is shown. Cable puller 10 includes a motor 12 that transfers electrical energy to a mechanical master gear 14. Motor 12 is shown as a relatively small AC/DC type motor, however, any appropriate power means can be utilized. Motor 12 has a first driving gear 13 which communicates with first driven gear 14. Mounted on the same shaft as first driven gear 14 is a second driving gear 15 as shown in FIG. 3. In turn, second driving gear meshes with a second driven gear 16 which is mounted on a shaft 21. Mounted on the other end of shaft 21 is a third driving gear 17, see FIG. 2. Third driving gear 17 drives a third driven gear 18. Third driven gear 19 is mounted on the same shaft as a final driving gear 19. Final driving gear meshes with the final driven or master gear 20 which drives a roller 22. In operation, powered roller 22 together with a non-powered roller 24 pass the length of cable therebetween, which will be described further herein.

Once the cable operation is started, the pulling of the cable is virtually a hands-off operation requiring little to no man-power. The motor 12 could be controlled by a hand-held controller (not shown) or other type remote controller.

Figure 4:
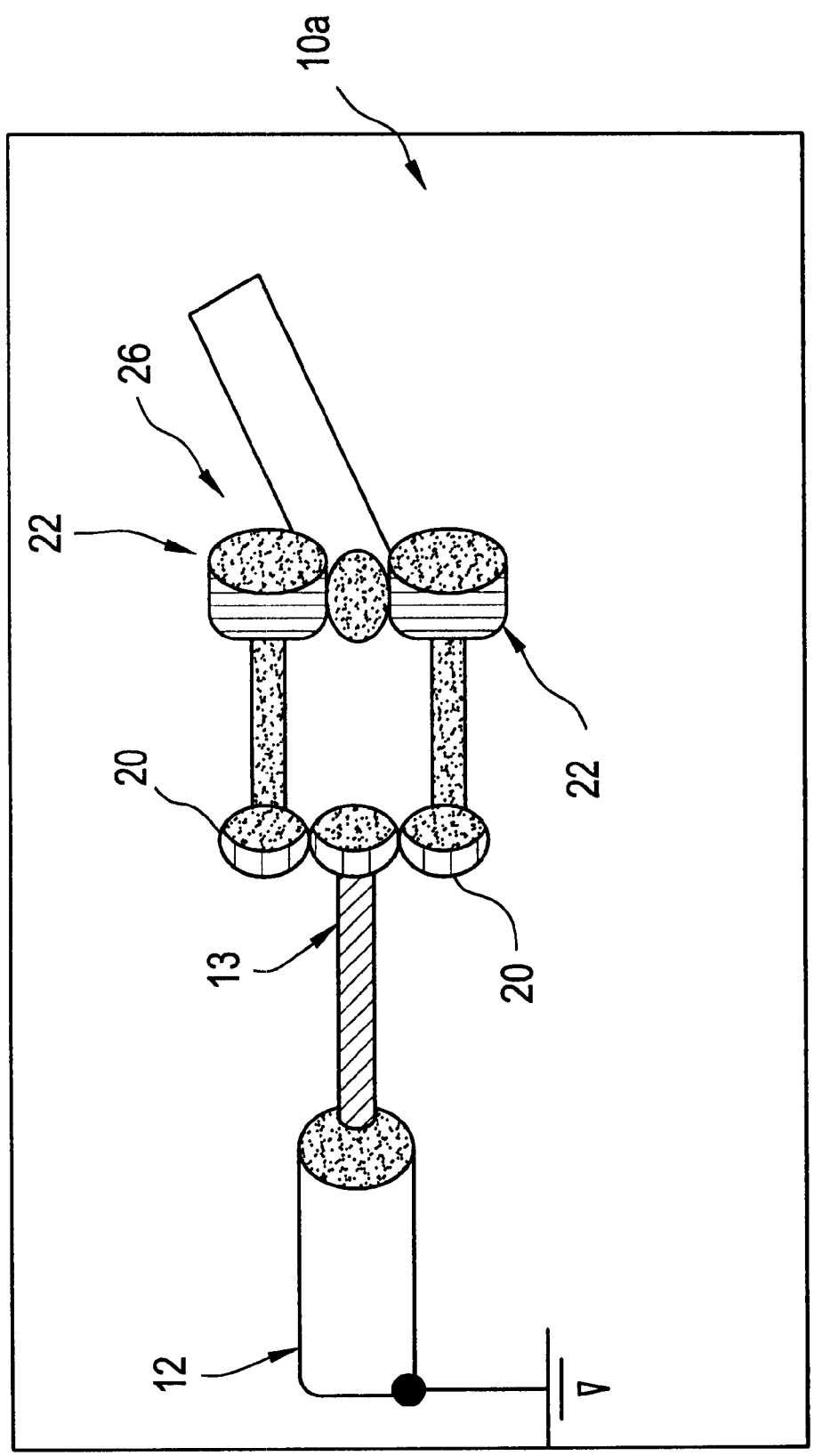
FIG. 4 is a perspective view of a second embodiment of the cable pulling apparatus having a pair of driven rollers.

The cable puller offers the versatility of changing the number of rollers under power. FIG. 4 illustrates a second embodiment of the cable pulling apparatus, where a pair of rollers are under power. Like the embodiment of FIGS. 1–3, the cable puller 10a includes a motor 12 that transfers electrical energy to master gear 20. However, apparatus 10a includes a pair of driven rollers 22. As shown in a simplified manner, each powered roller is driven by the final driven or master gear 20. The drive rollers can be a wheel, roller or tire mounted on the shaft. A length of cable 28 is passed through the rollers 22 and the cable 28 is pushed or pulled in the direction shown by arrow 26.

FIGS. 5A–5D show cable puller 10 mounted in four different orientations. Due to the numerous mounting configurations, the cable can be pushed and pulled simultaneously. The upstream pump will be seen by a downstream pump as "pulling," while the upstream pump will see the downstream pump as "pushing" cable.

Figure 5A:
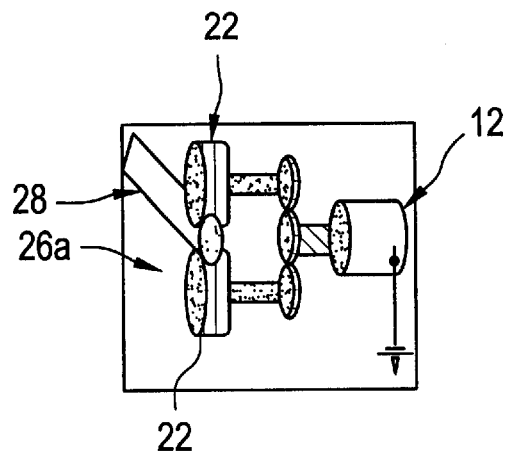
FIGS. 5A–5D are perspective views of the cable pulling apparatus mounted from the right side, the left side, a ceiling surface, and a floor surface, respectively.

FIG. 5A illustrates the cable puller mounted using an attachment means proximate to the motor 12. Mounted in this configuration, cable 28 can be pushed or pulled in a left horizontal direction 26a at various heights above a floor surface. The cable pump frame will employ multiple attachment points, i.e., holes, eyebolts, attachment screws, to allow mounting and stabilization of the pump in any possible position while pulling or pushing the cable (see FIGS. 9A–9E).

Figure 5B:
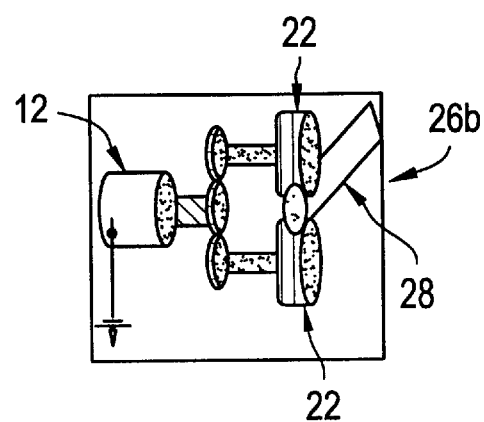
Figure 5C:
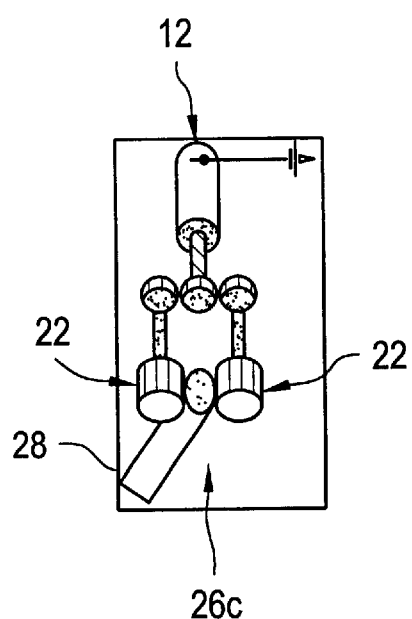
Figure 5D:
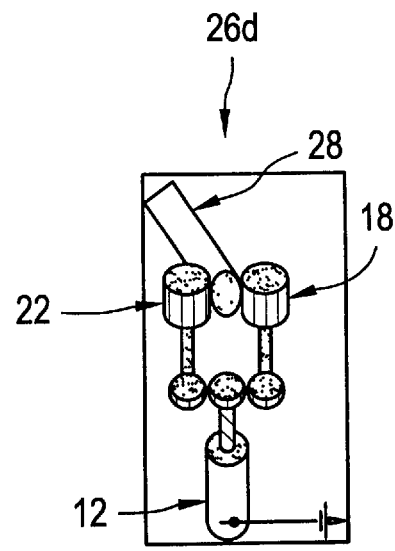

In the mounting configuration of FIG. 5B, the cable can be pushed or pulled in a right horizontal direction 26b at various heights above a floor surface. FIG. 5C shows a mounting configuration which allows cable 28 to be pushed or pulled in a horizontal direction 26c while mounted on a ceiling surface, such that the cable apparatus is facing downward. FIG. 5D represents the cable puller mounted on a floor surface, i.e., facing upwards, using an attachment means proximate to the motor. This mounting configuration allows the cable to be pulled in a horizontal direction 26d.

By mounting a plurality of cable pulling apparatuses at different locations and with the different configurations of FIGS. 5A–5D, the cable can traverse a variety of different turns and directions. As shown in FIG. 6, with a plurality of apparatuses, the cable can adjust to all on-board headings, for example, a straight pull designated via apparatus 10', a corner turn at 10", an up-bend at 10''' etc., can be performed simultaneously. The various turns and bends can be negotiated by differentially adjusting the speed of any two, or more apparatuses to induce slack around a corner and then equalize the speed between all of the apparatuses to continue the cable along the preferred route. After the cable is threaded through all of the cable pullers the process becomes fully automatic and does not require any manual moving or flexing of the cable to provide continuous feed of the cable along the preferred route or path.

Figure 7:
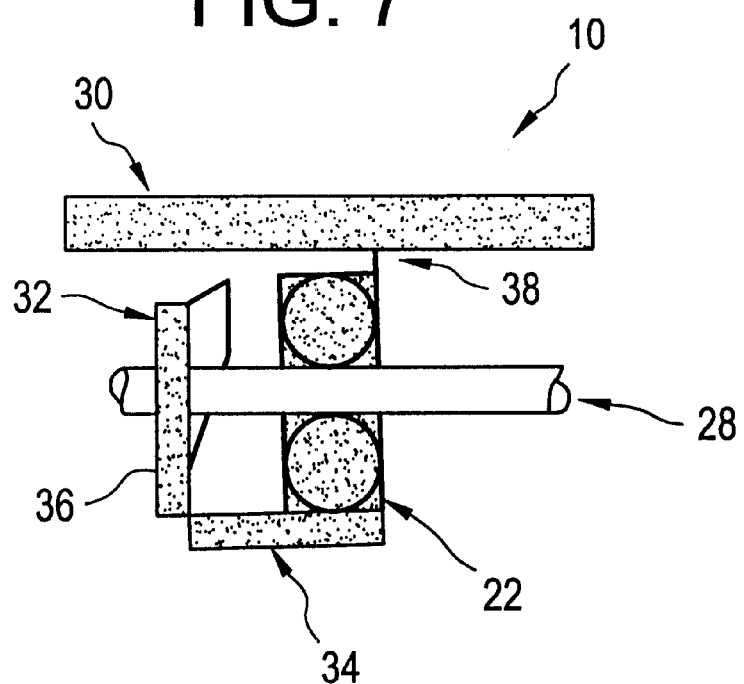
FIG. 7 illustrates a first mounting arrangement of the present invention.

The cable apparatus can be removably mounted in a plurality of ways. FIG. 7 shows cable puller 10 mounted to a ceiling surface 30. The cable puller 10 is attached to ceiling surface 30 using a hanger 32. Hanger 32 forms a three-point anchor of a brace 34 and a bracket 36 which can be made of steel or other material of comparable strength. Bracket 36 has rectangular sides that a define an opening for the cable to pass therethrough. Brace 34 is attached to the ceiling surface 30 at one end via a hanger pad eye 38 and is L-shaped to wrap around and cradle the cable puller 10. The other end of brace 34 is connected to bracket 36 to provide complete bottom support to the cable puller 10. The bottom of brace 34 is also used to support the cable 28 as it is pushed or pulled through cable puller 10 and through bracket 36.

Figure 8:
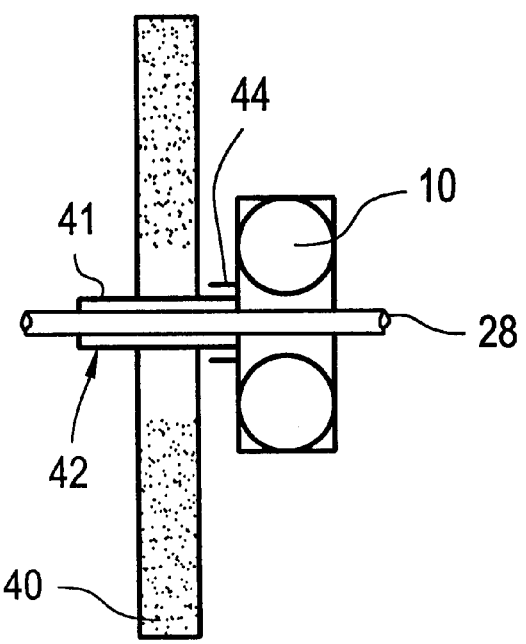
FIG. 8 is a front view of a second mounting arrangement of the cable pulling apparatus of the present invention.
Figure 9A:
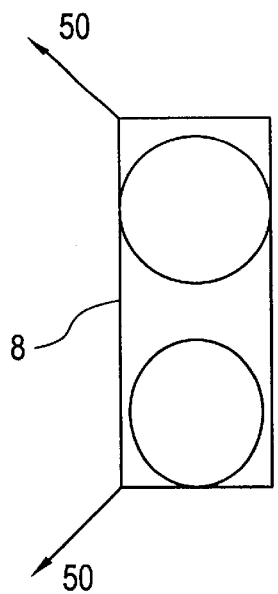
FIGS. 9A–9E are front views of a plurality of different mounting arrangements according to another embodiment of the cable pulling apparatus of the present invention.
Figure 9B:
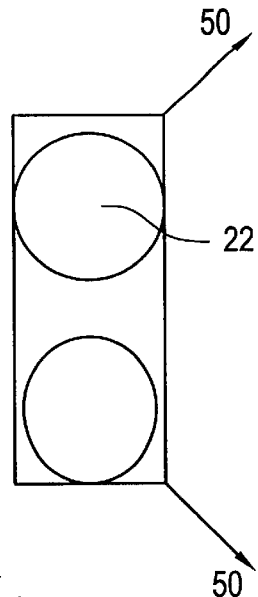
Figure 9C:
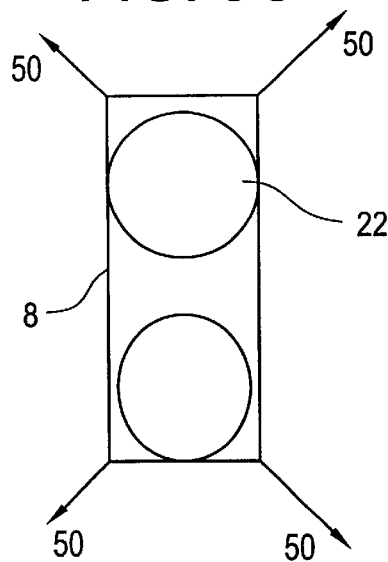
Figure 9D:
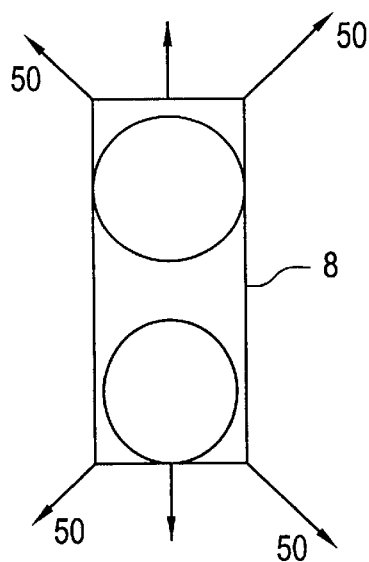
Figure 9E:
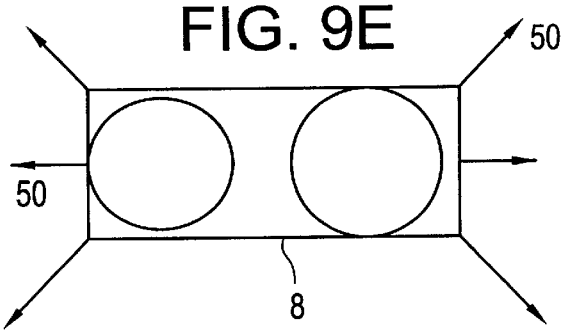

Cable apparatus 10 can also be attached to the bulkhead stuffing tubes of a ship compartment. Referring to FIG. 8, a stuffing tube 42 of bulkhead 40 includes a lip 41 to which the cable puller 10 can be attached via a clamp 44.

FIGS. 9A–9E can also be anchored to ceilings, decks or other fixed objects using a plurality of braces or guide wires 50 attached to various points on the cable pulling apparatus frame 8. The cable pump can be secured in any position by bolting the frame or attaching strong steel guide wires to hold the pump in place using turn buckles to take out slack. Such an attachment scenario prevents the cable puller from "walking" up or down the cable and also reduces oscillations induced by either torque, gravity, or unequal weight distribution.

Figure 10A:
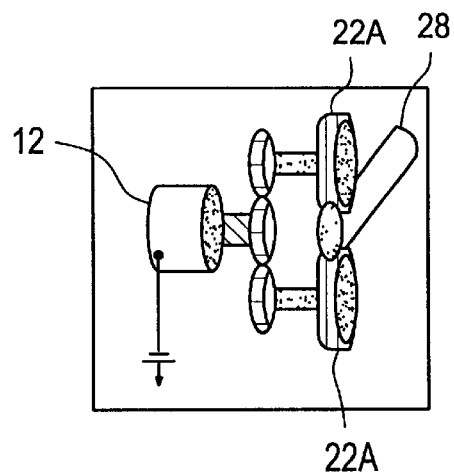
FIG. 10A is a perspective view of a cable pulling apparatus with large diameter rollers.
Figure 10C:
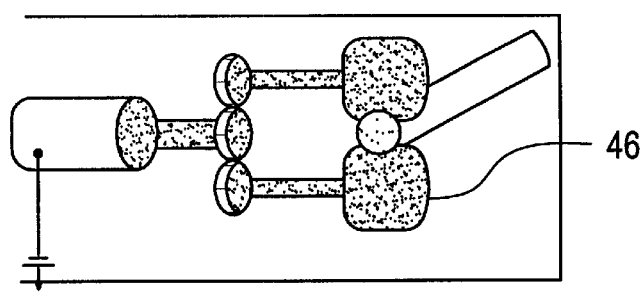
FIG. 10C is a perspective view of a cable pulling apparatus using tires to pull cable.
Figure 10B:
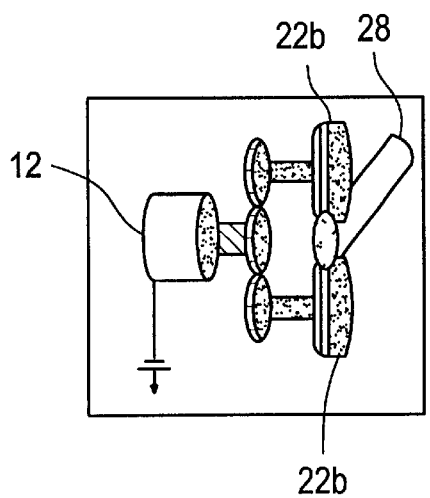
FIG. 10B is a perspective view of a cable pulling apparatus with small diameter rollers.

The cable pulling apparatus of the present invention can be adjusted or sized to fit different size cable. FIGS. 10A and 10B represent embodiments of the cable pulling that adjust for pulling smaller and larger sized cable by changing the size of the rollers. The use of large diameter drive rollers 22a, shown in FIG. 10A, allows for moving larger diameter cable 28, for example, 3.5 in diameter cable. Conversely, FIG. 10B illustrates the same type of cable puller 10 utilizing smaller diameter rollers 22b to fit smaller diameter cable 28. Where tires 46, see FIG. 10C, are used as rollers 22 the cable puller can also be adjusted to accommodate different diameter cables by inflating or deflating the tires.

Figure 11:
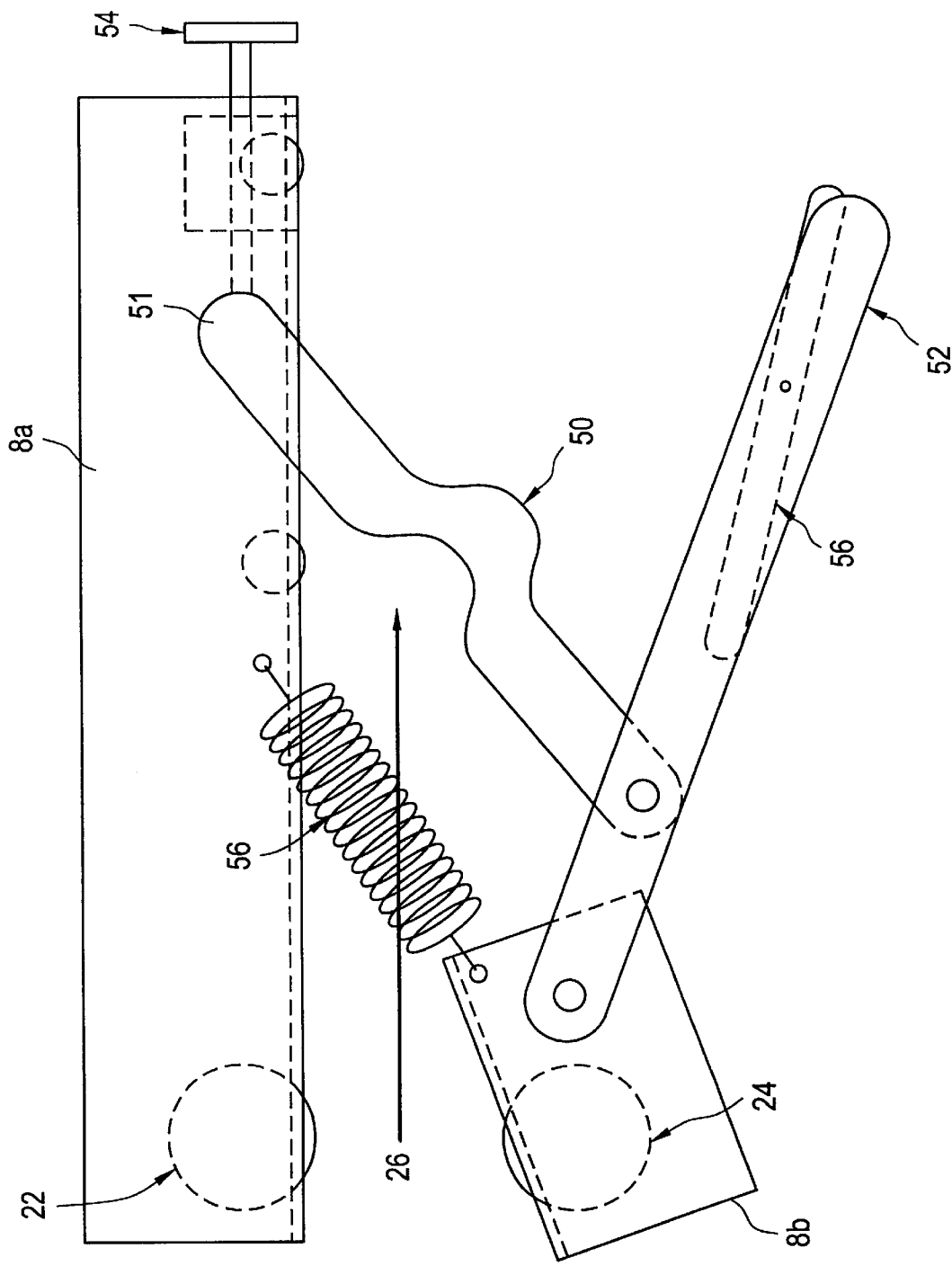
FIG. 11 is a side view of the cable pulling apparatus having a first cable friction adjusting device.

The applied forces or friction between the cable and rollers can be increased or decreased in additional manners. FIG. 11 is a side view of another embodiment of a cable size adjustment device for the cable puller. A linlkage 50 is attached at one end to the frame 8a which supports powered or driven roller 22. Although a linlkage 50 is provided on each side of the frame only one is shown for simplicity. Also located on frame 8a and communicating with end 51 of linkage 50 is a tightening screw 54. The other end of linkage 50 is rotatably attached to a handle 52. Handle 52 is in turn attached to frame section 8b which supports non-driven roller 26. A spring 56 is located between frame sections 8a and 8b. Like linkage 50, a spring is provided on each side of the frame sections, however only one spring 56 is shown. As the cable moves in the direction of arrow 26 between rollers 22 and 24 it encounters guide rollers 58 disposed in frame section 8a.

In operation, tightening screw 54 is adjusted to lock against end 51 of linlkage 50 to position the same. Next handle 52 is pushed to lock down on the cable. Thus, the rollers 22, 24 are forced against the cable to increase friction between the rollers and the cable in adjustable increments. When it is time to readjust the rollers a release lever 60 located on handle 52 can be manipulated to release the same.

Figure 12:
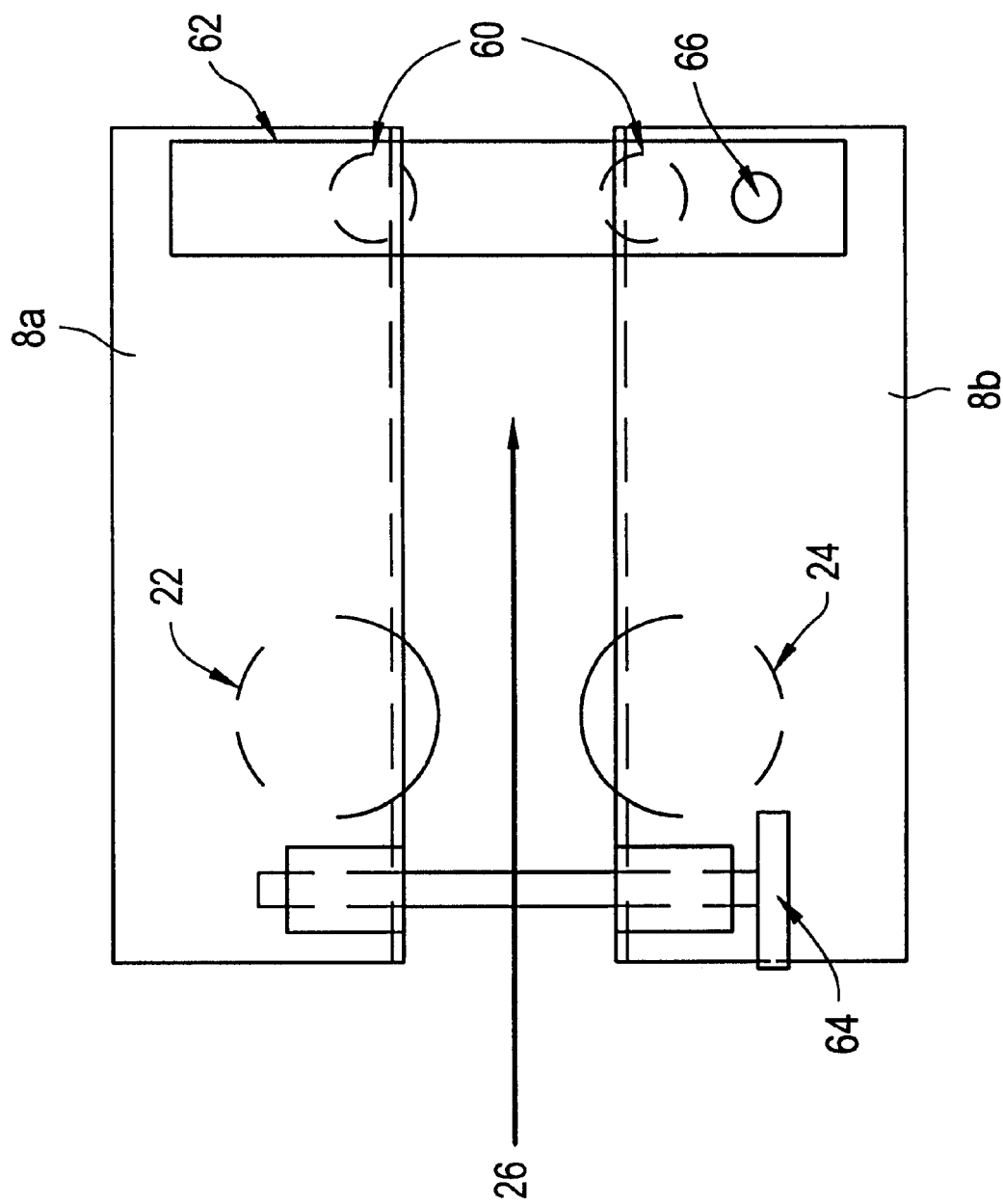
FIG. 12 is a side view of the cable pulling apparatus having a second cable friction adjusting device.

As shown in FIG. 12, pressure or friction between the rollers and cable can be adjusted using tightening screws 64 and plates 62 positioned between frame sections 8a and 8b, only one of each being shown. Tightening screw 64 can be manually adjusted to increase the friction as the cable passes through rollers 18,24 and guide rollers 60. A pin 66 positioned through the lower end of plate 62 is provided to allow the lower half of the cable puller to be separated.

Figure 13:
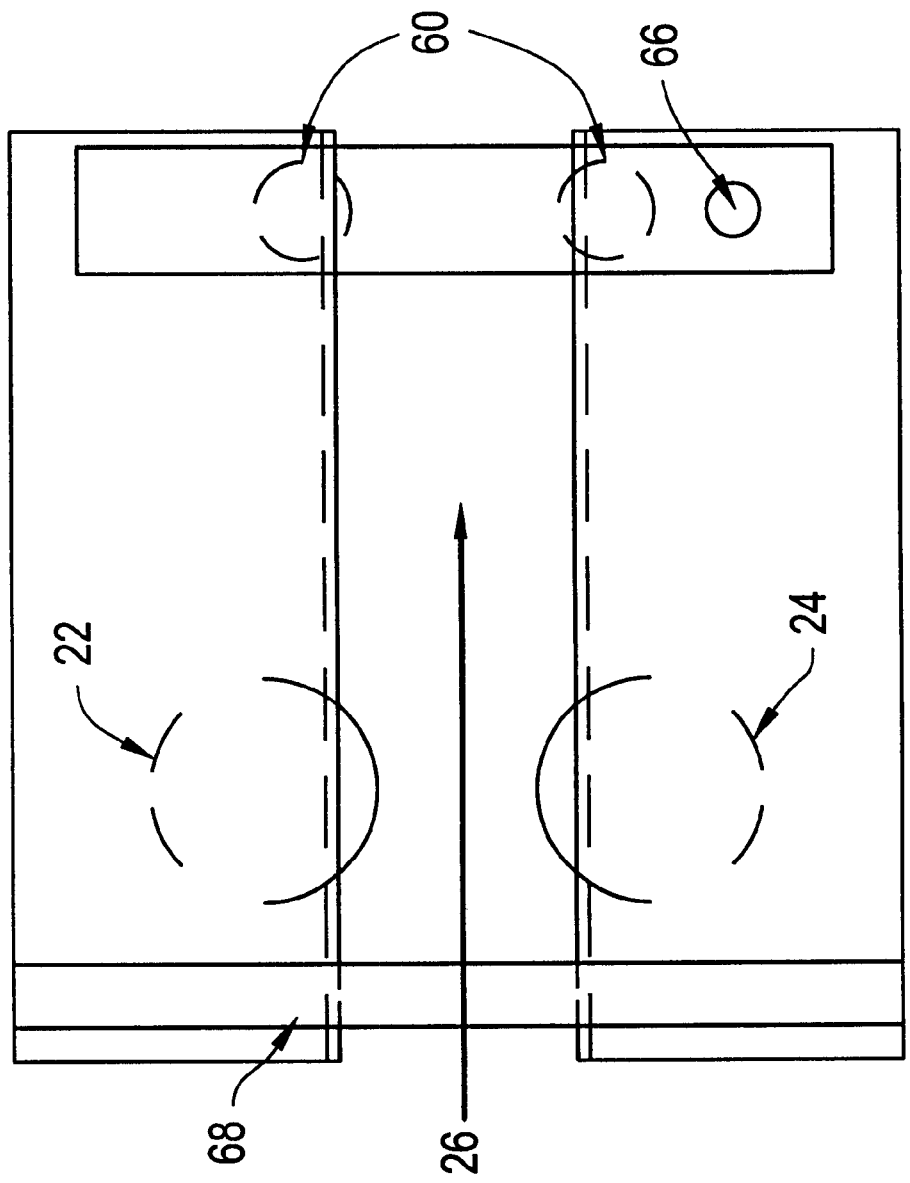
FIG. 13 is a side view of the cable pulling apparatus side view of the cable pulling apparatus having another cable friction adjusting device.

FIG. 13 illustrates another embodiment for adjusting the friction between the rollers and the cable. In FIG. 13, a tightening strap 68 is provided for increasing or decreasing the distance between rollers 22 and 24.

Figure 14:
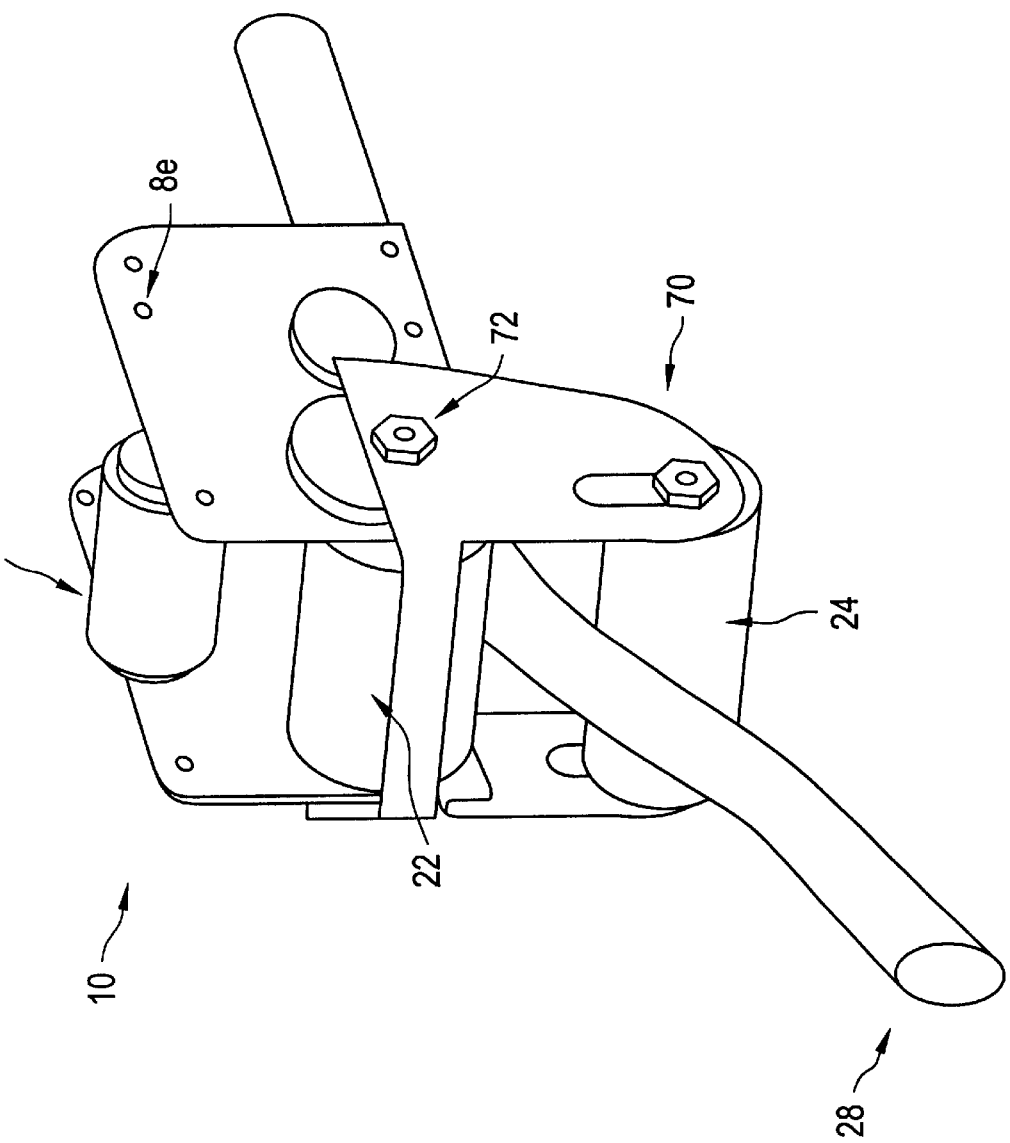
FIG. 14 is a perspective view of the cable pulling apparatus with a removable non-driven roller.

In another configuration, shown in FIG. 14, the non-power roller 24 is simply moved up or down in slots 70 in frame 8 and held in place by tightening axle nuts 72 to adjust friction on the cable. The frame includes a plurality of attachment points 8E which can be apertures for receiving fasteners, such as eye bolts, and/or attachment screws. Axle nuts 72 can be removed to remove roller 24 from the frame.

Figure 15:
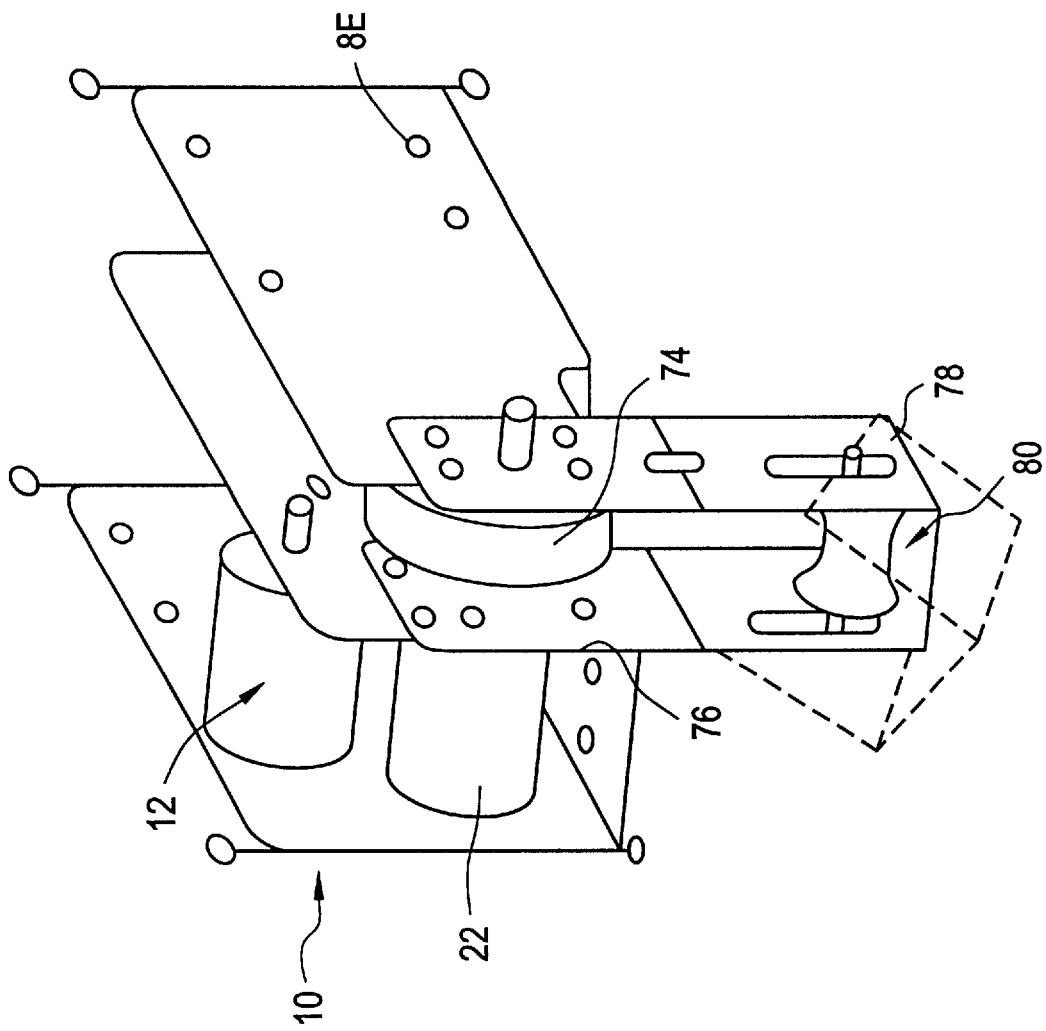
FIG. 15 is a perspective view of the cable pulling apparatus with a removable driven roller.

As shown in FIG. 15, in another embodiment, the shaft of the powered roller 22 can be extended and a drive wheel 74 attached thereto. Drive wheel 74 is mounted to rotate within a yoke 76 attached to frame 8. Yoke 76 includes a stationary upper part and a lower part 78 hingedly connected to the upper portion. As shown in dashed outlined, lower part 78 can me moved to allow engagement with the cable not shown. Mounted within lower part 78 is an adjustable clamping roller 80. Roller 80 can be moved up and down within the slots to adjust the friction of the cable between driving wheel 74 and clamping roller 80.

Figure 16:
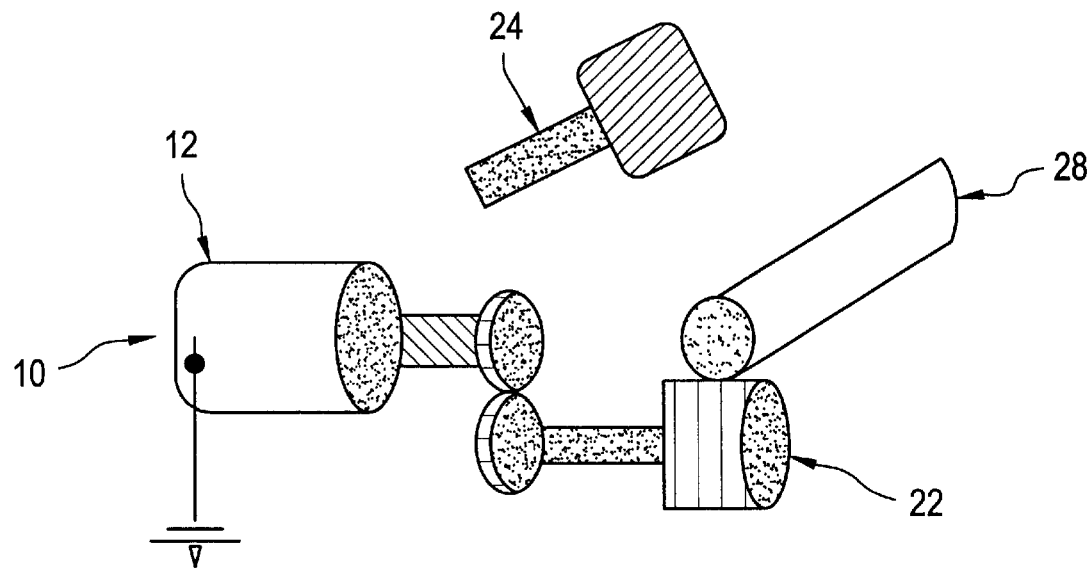
FIG. 16 is a perspective view of the cable pulling apparatus having a variable power supply.
Figure 17:
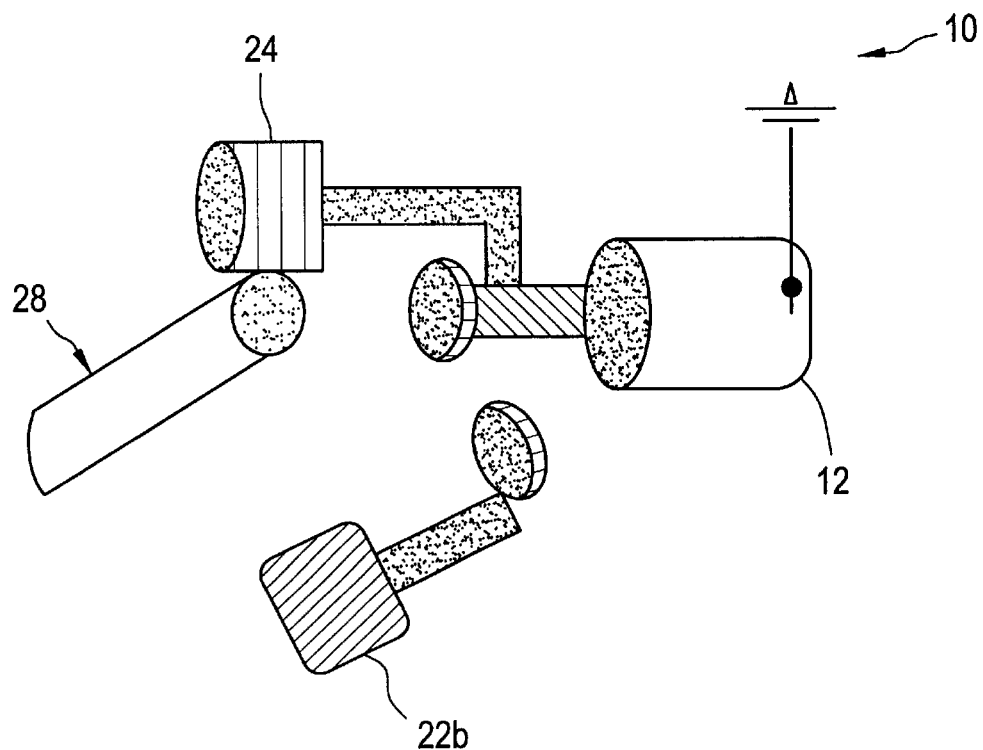
FIG. 17 is a perspective view of the cable pulling apparatus utilizing a piece of friction reducing material over the hanger bracket.

As discussed above, the lower half of the cable puller can be removed for both ease of installment and detachment. The removal of either the powered or non-powered roller allows rapid installation and quick detachment from the cable. In FIG. 16 the cable puller 10 includes a removable non-driven roller 24. FIG. 17 shows the driven roller 22b being detachable.

Figure 18:
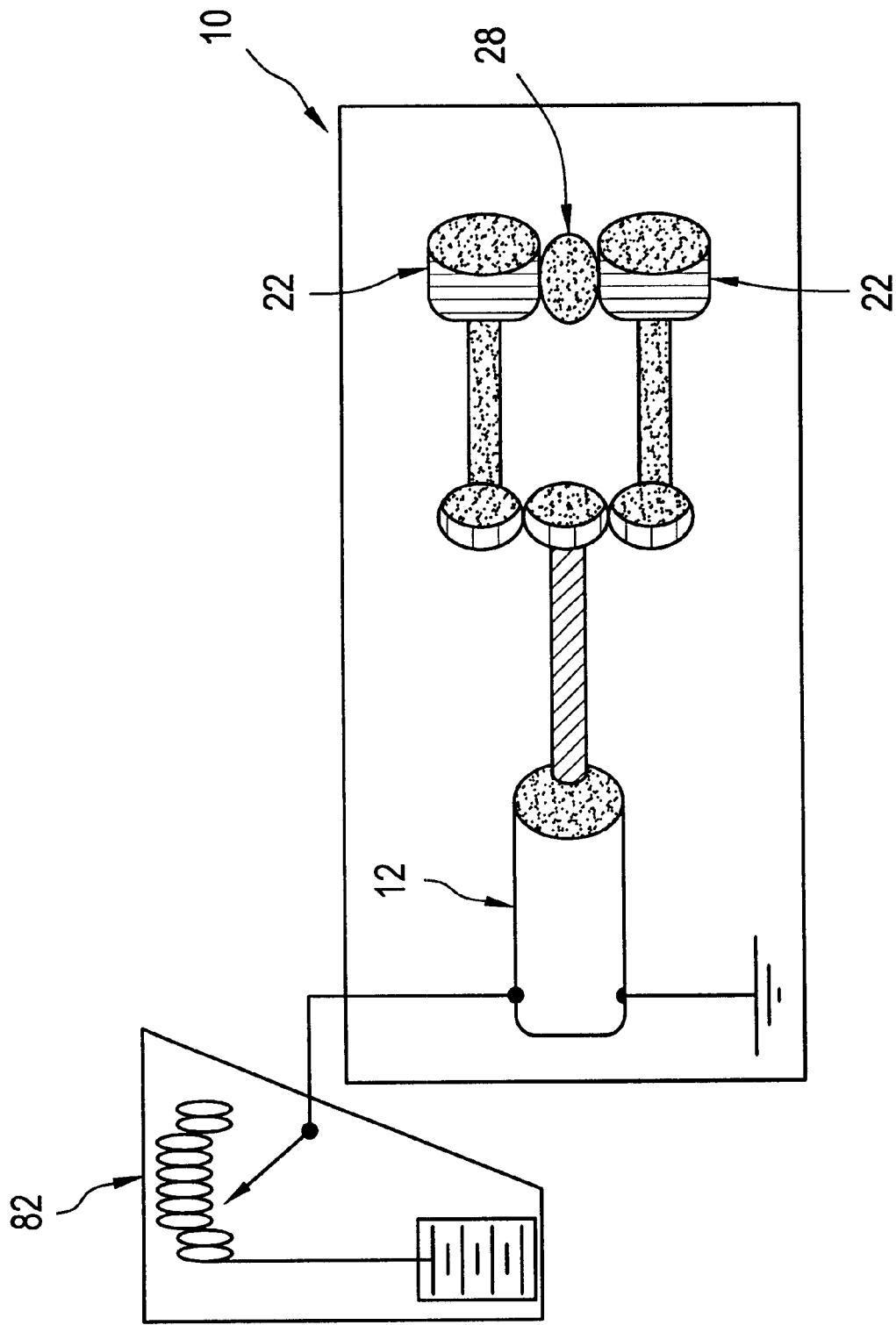
FIGS. 18, 19, and 20A–C are side views of the rollers of the cable pulling apparatus mounted within and at both sides of the frame.

Speed of the cable puller can be adjusted in a variety of manners, for example, decreasing the supplied amperage to the electric motor or lowering the voltage using a line rheostat. FIG. 18 illustrates a variable power supply 82, which is used to increase or decrease the speed of the cable pulling operation. For example, if the power is adjusted high then the increased energy delivered to the drive roller(s) 22 will increase the turning speed of the drive rollers and increase the overall cable pulling operation. Also, the wheel diameter or roller size or the gearing ratios can be changed to increase operation speed. Furthermore, by increasing the air pressure in the tires the tires will squeeze more forcibly against the cable also increasing operation speed.

Figure 19:
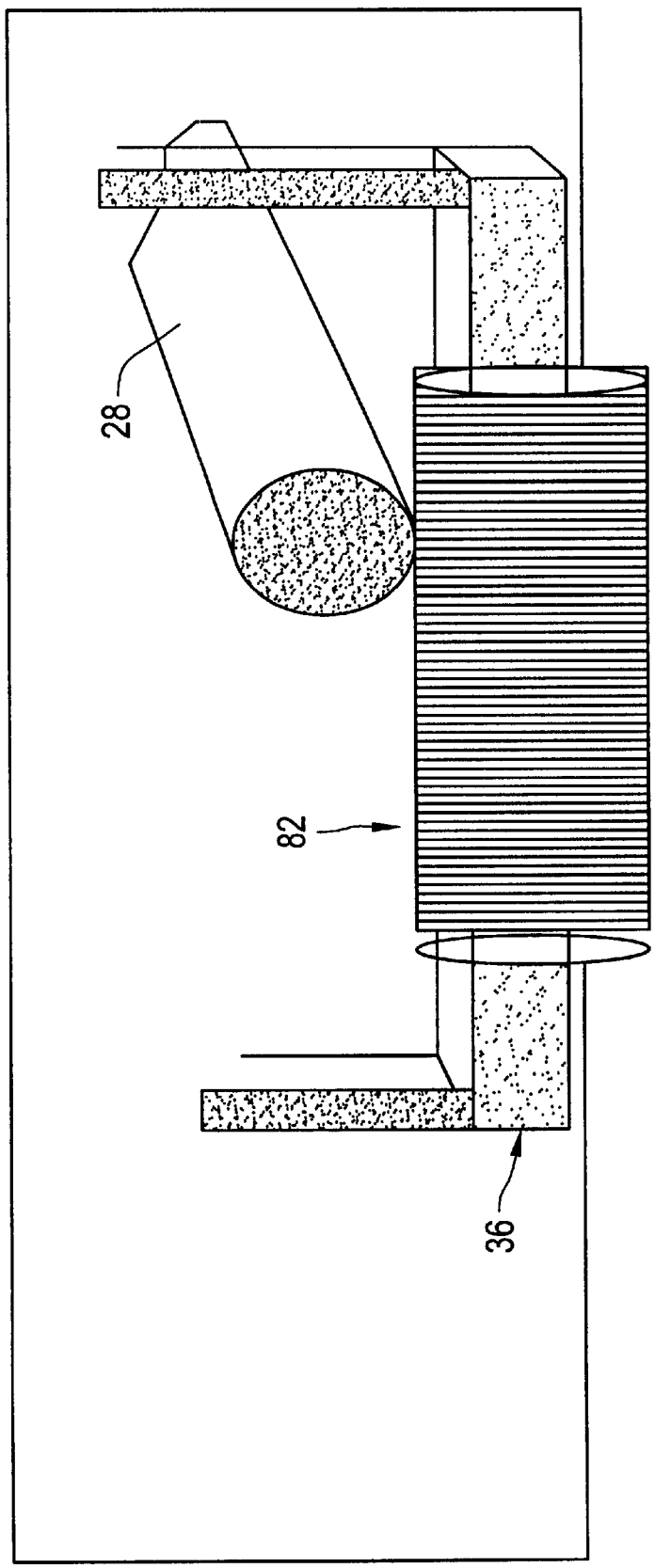

To lessen the force required to move the cable a wrapping can be provided around the contact surfaces of the cable puller where it is desirous to reduce friction. As shown in FIG. 19, cable hanger bracket 36 (FIG. 7) can be wrapped by a sheet of material 82, such as TEFLON™, such that the cable 12 passes through the bracket easily during the cable pulling operation.

Figure 20A:
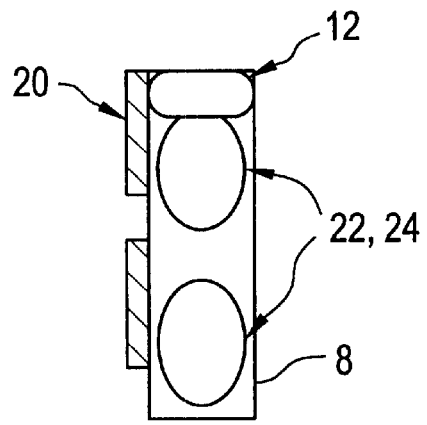
Figure 20B:
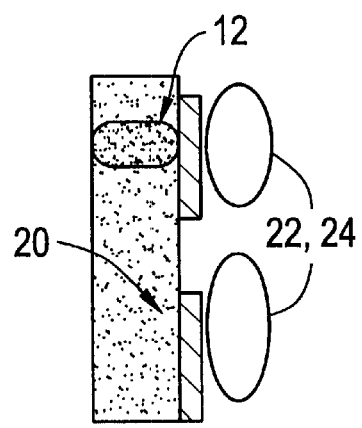
Figure 20C:
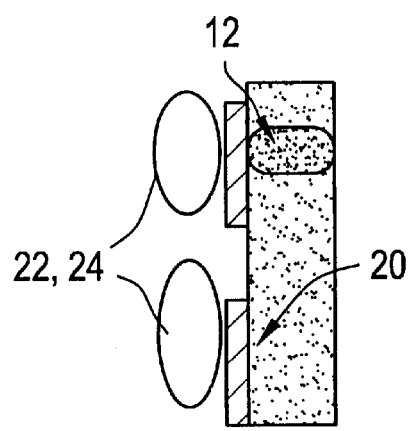

The rollers 22, 24 can be mounted within the center of frame 8 or on either side. As shown in FIG. 20A, rollers 22, 24 are mounted within the sides of the frame. Motor 12 is also mounted within the frame. Gears 20 are mounted on the outside of frame 8 along one side thereof. FIGS. 20B and 20C illustrate the drive rollers mounted on either side of the frame.

The cable pulling apparatus of the present invention can also be used in conjunction with a winch pulling system to further reduce any chance of damage to the cable sheath or to make it even easier to negotiate a particular change in direction of the cable. While the discussion and descriptions address a gearing relationship between the power source and the pump's powered roller, the same power transfer and rotational reductions could be achieved with v-belts and pulleys.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cable pulling apparatus comprising:

a frame;

a first roller driven by a power source and rotatably mounted to the frame;

a second roller rotatably mounted to the frame and spaced from said first roller to allow a cable to pass therebetween;

a plurality of drive gears engaged with said power source and at least said first roller for transferring a motive force of said power source to at least said first roller;

means for adjusting the spacing between said first and second rollers to adjust friction forces between said cable and said first and second rollers; and mounting means having a plurality of mounting configurations for mounting said frame in one of said plurality of different configurations to pull said cable in a variety of different directions.

2. The apparatus of claim 1, wherein said second roller is driven by said power source.

3. The apparatus of claim 1, wherein said first driven roller is removably mounted within the frame for ease of cable installation and detachment.

4. The apparatus of claim 1, wherein said second roller is removably mounted within the frame for ease of cable installation and detachment.

5. The apparatus as in claim 1, wherein said adjusting means comprises an adjustment device mounted on the frame for incrementally adjusting the space between said first and second rollers.

6. The apparatus of claim 5, wherein said adjustment device comprises an adjustable linkage mounted on the frame between the first and second rollers to adjust the spacing therebetween.

7. The apparatus of claim 5, wherein said adjustment device comprises a tightening screw mounted on the frame between the first and second rollers to adjust the spacing therebetween.

8. The apparatus of claim 5, wherein said adjustment device comprises a tightening strap mounted on the frame between the first and second rollers to adjust the spacing therebetween.

9. The apparatus of claim 1, further comprising means for varying the speed of the cable pulling operation.

10. The apparatus of claim 1, wherein the apparatus is removably mountable within interior compartments of a marine vessel.

11. The apparatus of claim 1, wherein said mounting means comprises a hanger which is attachable to a ceiling surface.

12. The apparatus of claim 11, wherein the hanger comprises an L-shaped brace and a bracket attached to the brace, the frame and rollers being anchored by said brace and bracket.

13. The apparatus of claim 12, wherein the bracket includes a pair of rectangular sides defining an opening through which the cable extends.

14. The apparatus of claim 13, wherein the bracket is wrapped with a length of friction reducing material so that the cable passes through the bracket easily.

15. The apparatus of claim 1, wherein said mounting means comprises a clamp attached to said frame, the clamp being positionable on an interior bulkhead of a marine vessel.

16. The apparatus of claim 1, wherein said mounting means comprises a plurality of guide wires attached between a plurality of points on said frame and a surface to which the apparatus is mounted.

17. The apparatus of claim 1, wherein said first and second rollers are mounted within the frame.

18. The apparatus of claim 1, wherein the first and second rollers are mounted on a side of the frame.

19. The apparatus of claim 1, wherein the power source is a motor mounted within the frame.

20. The apparatus of claim 1, wherein said adjusting means comprises a pair of slots in said frame, said second roller being movably mounted within said slots to adjust the spacing between said first and second rollers.

21. A cable pulling apparatus comprising:

a frame;

a yoke hingedly connected to the frame;

at least one roller driven by a power source and rotatably mounted to the frame;

a driving wheel driven by said roller and rotatably mounted within said yoke;

a clamping roller movably and rotatably disposed within the yoke and spaced apart from said driving wheel to allow a length of cable to pass therebetween;

means for adjusting the spacing between said drive wheel and said clamping roller to adjust friction forces between said drive wheel and said clamping roller; and mounting means having a plurality of mounting configurations for mounting said frame in one of said plurality of different configurations to pull said cable in a variety of different directions.

22. The apparatus of claim 21, wherein said adjusting means means comprises a pair of slots located in the yoke, said clamping roller being movably disposed within said slots to adjust the spacing between the drive wheel and clamping roller.

* * * * *